(No Model.)
G. E. ALLEN.
COMBINED PROTRACTOR AND BEVEL
No. 460,421. Patented Sept. 29, 1891.
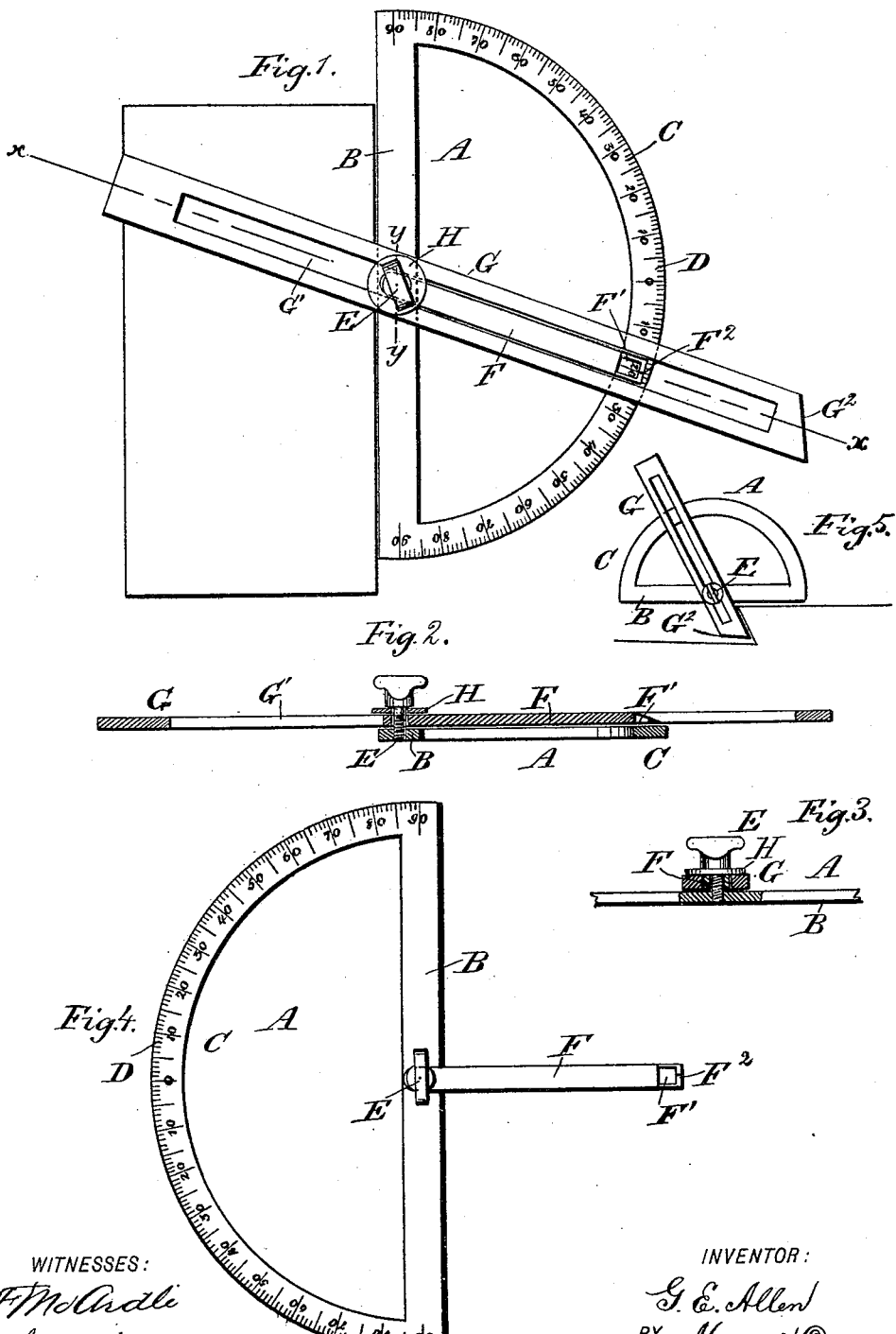

UNITED STATES PATENT OFFICE.

GEORGE E. ALLEN, OF HARTFORD, CONNECTICUT.

COMBINED PROTRACTOR AND BEVEL.

SPECIFICATION forming part of Letters Patent No. 460,421, dated September 29, 1891.

Application filed April 3, 1891. Serial No. 387,518. (No model.)

*To all whom it may concern:*

Be it known that I, GEORGE E. ALLEN, of Hartford, in the county of Hartford and State of Connecticut, have invented a new and Improved Combined Protractor and Bevel, of which the following is a full, clear, and exact description.

The object of the invention is to provide a new and improved combined protractor and bevel which is simple and durable in construction and readily adjusted for measuring angles, bevels, &c.

The invention consists of a protractor, a pointer pivoted in the center of the said protractor, and a bar fitted to slide on the said pointer and adapted to be secured thereon.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a face view of the improvement. Fig. 2 is a sectional side elevation of the same on the line $x$ $x$ of Fig. 1. Fig. 3 is a transverse section of part of the same on the line $y$ $y$ of Fig. 1. Fig. 4 is a face view of the improvement as arranged for measuring bevels, and Fig. 5 is a reduced face view of the improvement as applied for measuring the angle of a notch.

The improved measuring-instrument is provided with a protractor A, comprising the usual base B, and the semicircular arm C, containing on one face a graduation D, indicating degrees and subdivisions. The zero-point of the graduation D is in a line extending at right angles to the base B and passing through the center of the protractor, so that the ninety degrees are on the ends of the base B.

In the center of the protractor A on the base B is held a thumb-screw E, on which is mounted to swing a pointer F, having its outer end beveled and formed with an opening F', through which the graduation of the semicircular arm C can be seen. On the bevel end F' is arranged a marking-line $F^2$, indicating the proper degree to which the pointer F is moved on the protractor A. On the pointer F is fitted to slide a bar G, provided with a slot G', into which the pointer is snugly fitted, the bar G resting on the base B and the graduated arm C. On one outer end of the bar G is formed a bevel $G^2$, for the purpose of conveniently passing this end into a notch in case the angle of the latter is measured, as illustrated in Fig. 5. The bar G is of such a length as to project a sufficient distance beyond the base B when the device is used. A washer H is held on the thumb-screw E on top of the bar G and the pointer F, so that when the thumb-screw E is screwed up the shoulder of the thumb-screw presses on the washer H, and the latter upon the bar G, so that the latter is fastened in place on the protractor A, thereby holding the pointer F in proper position as the said pointer is engaged by the slot in the bar G. When the thumb-screw E is loosened, the bar G can be readily moved over the face of the protractor A until the marking-line $F^2$ of the bar F indicates the desired degree on the graduation D. The bar G can be moved inward or outward, as desired and as circumstances require, after which the thumb-screw E is screwed up, so that the bar G and pointer F are securely locked in place over the desired degree on the protractor A.

When it is desired to use the measuring-instrument as a bevel-square setter, the thumb-screw E is unscrewed from the base B, so that the bar G and the pointer F can be taken off, as well as the washer H. The pointer F is then again put in place on the protractor A and the thumb-screw E again screwed in the center of the base, so that its shoulder abuts directly on top of the pointer F. (See Fig. 4.) The pointer F can then be moved to any desired angle relative to the base B of the protractor to be used as a bevel-square setter in the usual manner.

Having thus fully described my invention, I claim as new and desire to secure by Letters Patent—

1. In an instrument of the class described, the combination, with a protractor, of a pointer pivoted in the center of the said protractor, and a bar fitted to slide on the said pointer and adapted to be secured with the said pointer on the said protractor, substantially as shown and described.

2. In an instrument of the class described, the combination, with a protractor, of a pointer pivoted in the center of the said protractor, a slotted bar engaging the said pointer and held to slide thereon, and means, substantially as described, for fastening the said bar and pointer to the said protractor, substantially as shown and described.

3. In an instrument of the class described, the combination, with a protractor, of a thumb-screw held in the center of the said protractor, a pointer mounted to turn on the said thumb-screw and formed at its free end with a bevel, an opening, and a marking-line, a slotted bar held to slide on the said pointer, and a washer engaged by the said thumb-screw and resting on top of the said bar, substantially as shown and described.

GEORGE E. ALLEN.

Witnesses:
ERNST SCHAU,
EDWARD EBERLE.